United States Patent
Beranek et al.

(10) Patent No.: US 7,672,845 B2
(45) Date of Patent: Mar. 2, 2010

(54) METHOD AND SYSTEM FOR KEYWORD DETECTION USING VOICE-RECOGNITION

(75) Inventors: Michael J. Beranek, Lake Villa, IL (US); Jason R. Malinowski, Acworth, GA (US)

(73) Assignee: International Business Machines Corporation, Armonk, NY (US)

( * ) Notice: Subject to any disclaimer, the term of this patent is extended or adjusted under 35 U.S.C. 154(b) by 1304 days.

(21) Appl. No.: 10/873,036

(22) Filed: Jun. 22, 2004

(65) Prior Publication Data

US 2005/0283475 A1    Dec. 22, 2005

(51) Int. Cl.
*G10L 15/22* (2006.01)
*H04M 3/51* (2006.01)

(52) U.S. Cl. ............... 704/251; 704/275; 379/88.01; 379/265.09; 379/265.12

(58) Field of Classification Search .......... 704/251, 704/257, 270, 270.1, 275, 276; 707/3, 4, 707/5; 379/88.01, 88.04, 265.09, 265.12
See application file for complete search history.

(56) References Cited

U.S. PATENT DOCUMENTS

| | | | |
|---|---|---|---|
| 4,081,607 A | | 3/1978 | Vitols et al. |
| 4,489,434 A | | 12/1984 | Moshier |
| 5,199,077 A | | 3/1993 | Wilcox et al. |
| 5,203,705 A | * | 4/1993 | Hardy et al. ............ 434/169 |
| 5,673,390 A | * | 9/1997 | Mueller ................. 714/57 |
| 5,717,826 A | * | 2/1998 | Setlur et al. ............ 704/252 |
| 5,983,190 A | * | 11/1999 | Trower et al. ............ 704/276 |
| 6,035,017 A | | 3/2000 | Fenton et al. |
| 6,058,435 A | * | 5/2000 | Sassin et al. ............ 719/331 |
| 6,175,830 B1 | * | 1/2001 | Maynard ................ 707/5 |
| 6,226,642 B1 | * | 5/2001 | Beranek et al. .......... 707/10 |
| 6,240,378 B1 | * | 5/2001 | Imanaka et al. .......... 704/9 |
| 6,263,333 B1 | | 7/2001 | Houchin et al. |
| 6,272,461 B1 | * | 8/2001 | Meredith et al. ......... 704/235 |
| 6,301,560 B1 | * | 10/2001 | Masters ................ 704/251 |

(Continued)

FOREIGN PATENT DOCUMENTS

JP    9-146959    6/1997

OTHER PUBLICATIONS

Paper entitled 41456 N-way Speech Driven Analysis and Interaction.

(Continued)

*Primary Examiner*—Martin Lerner
(74) *Attorney, Agent, or Firm*—William E. Schiesser; Greenblum & Bernstein P.L.C.

(57) ABSTRACT

A method and system is provided to monitor speech and detect keywords or phrases in the speech, such as for example, monitored calls in a call center or speakers/presenters using teleprompters, or the like. Upon detection of the keywords of phrases, information associated with the keywords or phrases may be presented to a display device so that a user may dynamically receive new information as context of the speech progresses. This provides dynamic information as the context of the conversation develops. The information may be presented as links, cues, text, or similar formats. The detected keywords or phrases may also be associated with rules that govern the conditions and criteria for processing the detected keyword and presentation of the information.

21 Claims, 4 Drawing Sheets

U.S. PATENT DOCUMENTS

| | | | |
|---|---|---|---|
| 6,304,653 B1 * | 10/2001 | O'Neil et al. | 379/265.09 |
| 6,311,182 B1 | 10/2001 | Colbath et al. | |
| 6,321,192 B1 | 11/2001 | Houchin et al. | |
| 6,324,513 B1 * | 11/2001 | Nagai et al. | 704/275 |
| 6,430,551 B1 | 8/2002 | Thelen et al. | |
| 6,952,809 B2 * | 10/2005 | Beranek et al. | 715/856 |
| 6,999,932 B1 * | 2/2006 | Zhou | 704/277 |
| 7,058,565 B2 * | 6/2006 | Gusler et al. | 704/7 |
| 7,092,888 B1 * | 8/2006 | McCarthy et al. | 704/277 |
| 7,110,525 B1 * | 9/2006 | Heller et al. | 379/265.11 |
| 7,130,861 B2 | 10/2006 | Bookman et al. | 707/102 |
| 7,177,798 B2 * | 2/2007 | Hsu et al. | 704/9 |
| 7,200,614 B2 * | 4/2007 | Reid et al. | 707/104.1 |
| 7,292,986 B1 * | 11/2007 | Venolia et al. | 704/276 |
| 7,318,021 B2 * | 1/2008 | Itoh et al. | 704/5 |
| 2002/0087326 A1 | 7/2002 | Lee et al. | |
| 2002/0087327 A1 | 7/2002 | Lee et al. | |
| 2003/0115064 A1 * | 6/2003 | Gusler et al. | 704/270 |
| 2004/0044515 A1 * | 3/2004 | Metcalf et al. | 704/1 |
| 2004/0057570 A1 * | 3/2004 | Power et al. | 379/265.13 |
| 2004/0193420 A1 * | 9/2004 | Kennewick et al. | 704/257 |
| 2004/0249636 A1 * | 12/2004 | Applebaum et al. | 704/231 |
| 2005/0004806 A1 * | 1/2005 | Lin et al. | 705/1 |
| 2005/0066335 A1 * | 3/2005 | Aarts | 719/316 |
| 2005/0094798 A1 * | 5/2005 | Yacoub | 379/265.12 |
| 2005/0195960 A1 * | 9/2005 | Shaffer et al. | 379/265.02 |
| 2005/0283369 A1 * | 12/2005 | Clausner et al. | 704/275 |
| 2006/0230334 A1 * | 10/2006 | Slawson et al. | 715/500.1 |

OTHER PUBLICATIONS

U.S. Appl. No. 08/736,154.

* cited by examiner

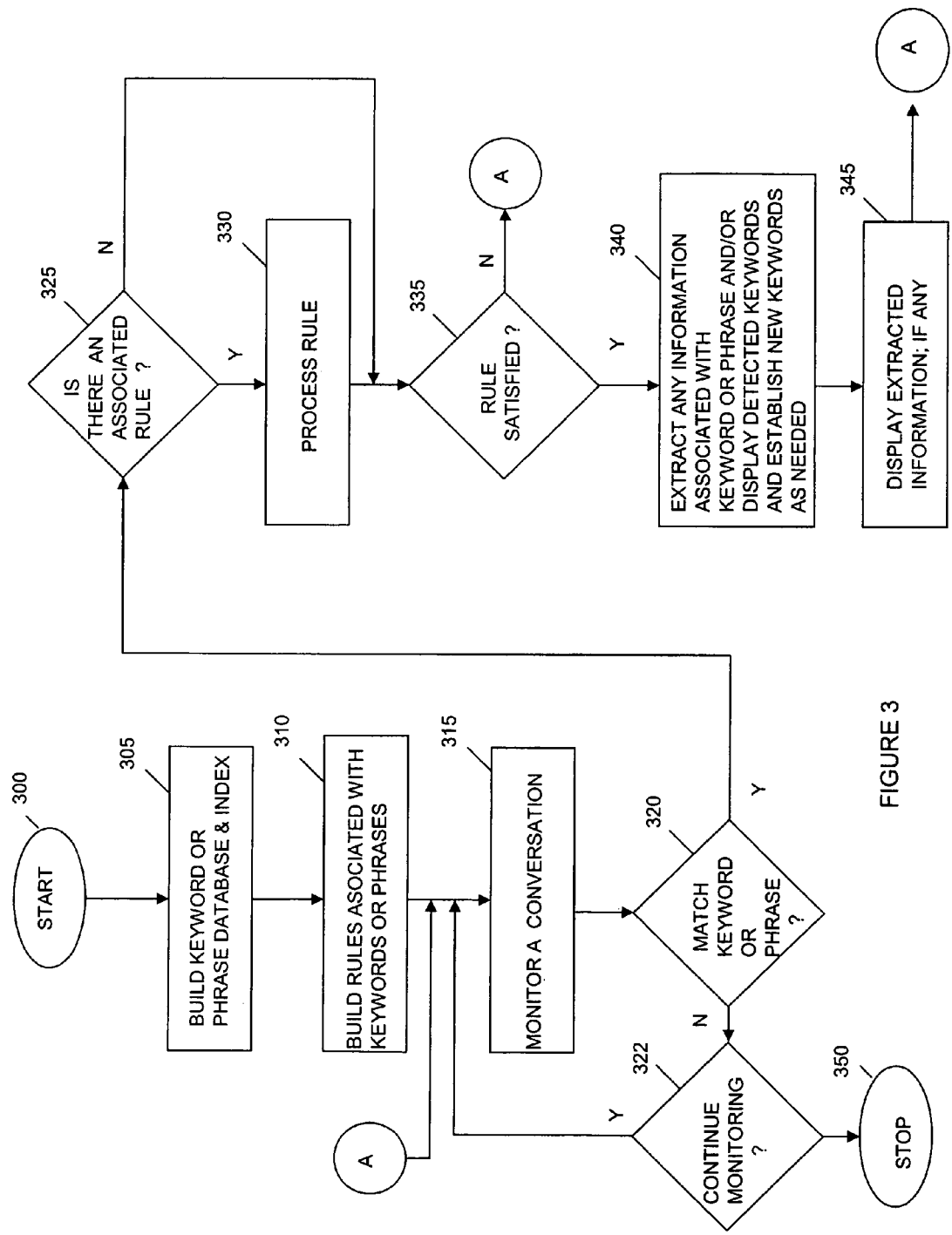

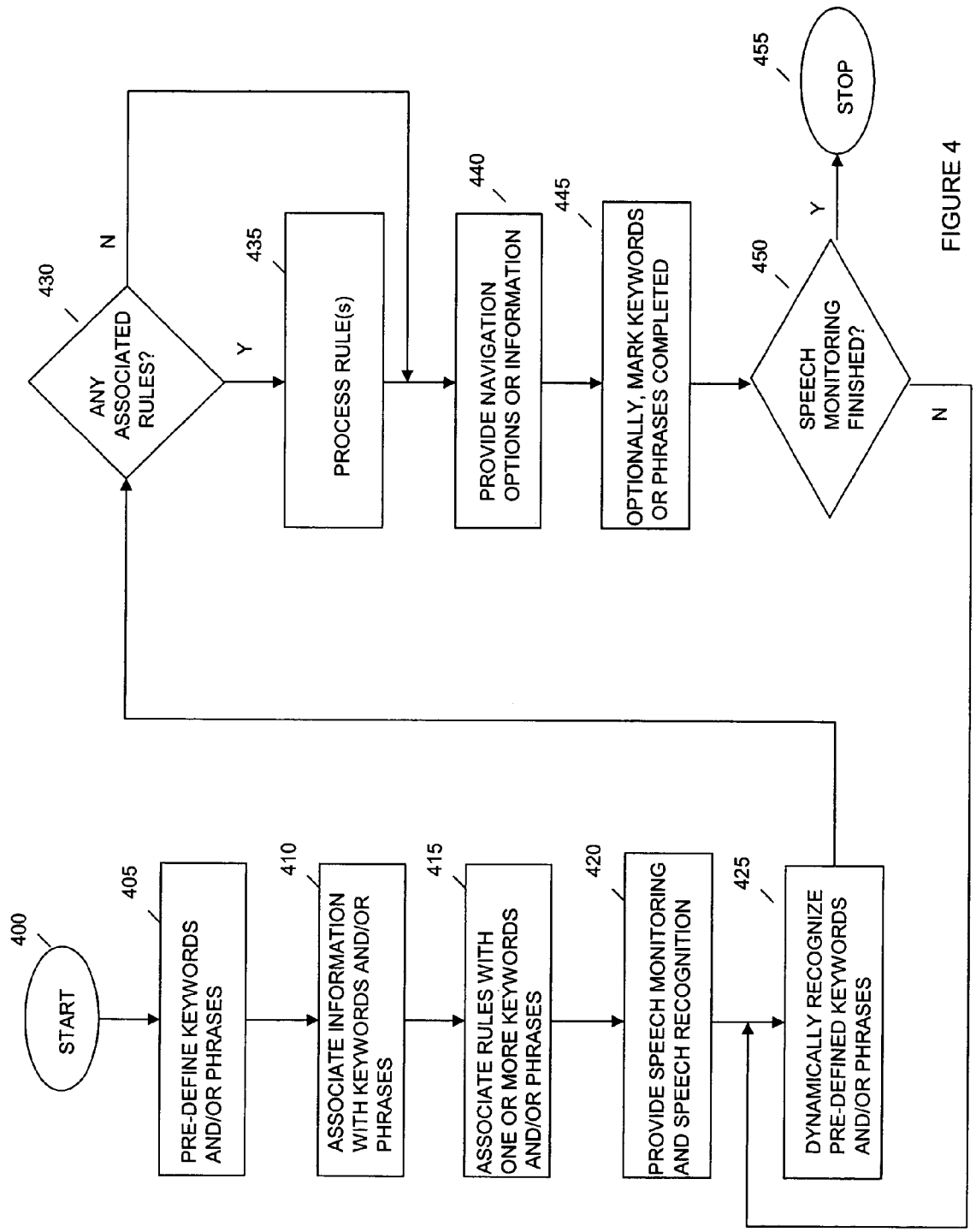

METHOD AND SYSTEM FOR KEYWORD DETECTION USING VOICE-RECOGNITION

BACKGROUND OF THE INVENTION

1. Field of the Invention

The invention generally relates to a method and system to detect keywords or phrases using voice recognition and, more particularly, to a method and system to detect keywords or phrases to dynamically provide cues and/or options for supporting the context of a conversation or speech.

2. Background Description

In various industries, such as service industries, it is common to interact with the public or customer base for a wide variety of reasons. Often a business or institution implements a call center having customer service agents that may include sales oriented agents, technical oriented agents, or general purpose oriented agents to receive and interact with a calling party.

Using a call center as an example, when a caller calls the call center, there may be a substantial number of reasons or topics that the caller may be interested in pursuing, such as, for example, account information, product or service inquiry, information inquiry, complaints, personal inquiry, or other record inquiry. The call may be for such reasons as initiating a transaction of some type such as a call to an insurance agency to report an accident, a query to a repair center, a call to place an order or inquire about financial status of an account. In any case, the agent that receives the call may be tasked with dealing with a large array of possible topics and may be expected to be conversant and proficient with the details of any of the caller's queries.

In current call center methods and systems, for example, an agent may be able to view the client's account and even a call history log that may automatically be presented on a display when the call is presented to the agent. However, during the course of a call, as the context of the conversation evolves, the agent must initiate any new requests for information that may be needed for conveyance to the caller. For example, as a caller inquires about a particular product model(s), the agent must navigate to any database entries for the product, manually, based on the agent's awareness. As a caller inquires about certain topics, the call center agent is typically expected to be agile and knowledgeable about what sources and related topics that may exist and also know how to locate the information. Aids such as cue cards, teleprompters, and notes are typical to aid the agent in their tasks. These are often cumbersome and require constant updating and distribution to call center personnel.

During the course of a conversation, as the scope and context of the interchange develops, a call agent must remember all the topics and manage to log the transaction, typically in some type of ticketing system or database, most of which is typically manually entered. Because call agents are often expected to be knowledgeable on a wide variety of subjects, and there is typically little standardization of the call management process to aid an agent based on the call context, confidence in the overall process of optimally responding to a caller's request may be jeopardized. An agent, or even the caller, may easily become frustrated if inadequate information is available in a timely manner during the course of a call. Further, a company or institution may be perceived as being unprepared or inadequate to deal with a wide variety of caller's subjects. If, however, an agent may automatically have access to reliable and timely information during a call, a higher level of satisfaction for the caller, agent, or institution may result.

In other situations, such as a teleprompter for a speaker giving a presentation, the teleprompter provides the speaker the capability to read from a set script but little ability to adjust the presentation based on reactions or questions from the audience. For example, a politician at a news conference cannot easily alter the sequencing of a presentation nor have new information made available based on questions from reporters. Additionally, if a presentation is altered, there is no easy way to remember important facts or topics that may have been temporarily skipped so that the topics may be quickly recalled and addressed later.

SUMMARY OF THE INVENTION

In an aspect of the invention, a method is provided for predefining one or more keywords relevant to a context of a conversation and associating information with the one or more keywords. The method includes detecting at least one of the keywords in speech and recording that at least one of the one or more keywords has been detected.

In another aspect of the invention, a method for monitoring voice is provided comprising monitoring speech for a pre-defined keyword or phrase and detecting the pre-defined keyword or phrase. The method comprises determining whether a rule is associated with the detected pre-defined keyword or phrase and processing the rule when the rule is determined to be associated with the predefined keyword or phrase.

In another aspect of the invention a system for monitoring speech is provided comprising at least one component to predefine one or more keywords relevant to a context of a conversation and to associate information with the one or more keywords. The system further includes at least one component to detect at least one of the keywords in speech and to provide the information associated with at least one of the detected keywords.

In another aspect of the invention, a computer program product is provided comprising a computer usable medium having readable program code embodied in the medium and includes a first computer program that includes at least one component to predefine one or more keywords relevant to a context of a conversation and to associate information with the one or more keywords, to detect at least one of the keywords in speech; and to provide the information associated with at least one of the detected keywords.

BRIEF DESCRIPTION OF THE DRAWINGS

FIG. 3 is flow chart of an embodiment showing steps of the invention; and

FIG. 4 is a flow chart of an embodiment showing steps of the invention.

DETAILED DESCRIPTION OF EMBODIMENTS OF THE INVENTION

This invention is directed to a method and system for providing context sensitive information or feedback. The invention provides for tracking keywords or phrases based on dynamics of a conversation, monologue or any speech. In various situations, the words and/or phrases of a speaker or similar knowledge-centered person such as, for example, a call center agent or speaker that may be interacting with other people, provides context to the conversation and may give rise to parallel or related information. In embodiments, the invention may simply track that certain keywords or phrases have been detected.

The invention provides for detecting key words or phrases that may occur during the interchange by monitoring the conversation, monologue, or broadcast and continuously comparing the detected keywords or phrases to a stored library of information, such as, for example, a knowledge database indexed by the keywords or phrases. The comparison may also involve rules for governing the sets of information or topics and parameters for matching so that the related information may be verified as germane to the conversation. In embodiments, if any germane related information or topic is discovered, the information or topic may dynamically be presented to the agent or other individual as necessary, via several methods. For example, the information or topic may be presented in the form of a cue, link or prompt so that awareness of the information is quickly made known. Alternatively, the rules may spawn new keywords or phrases that may require further monitoring for detection. Detection of any keywords may alternatively cause a recordation that the keyword has been detected without presentation of any new related information.

Figure 1:
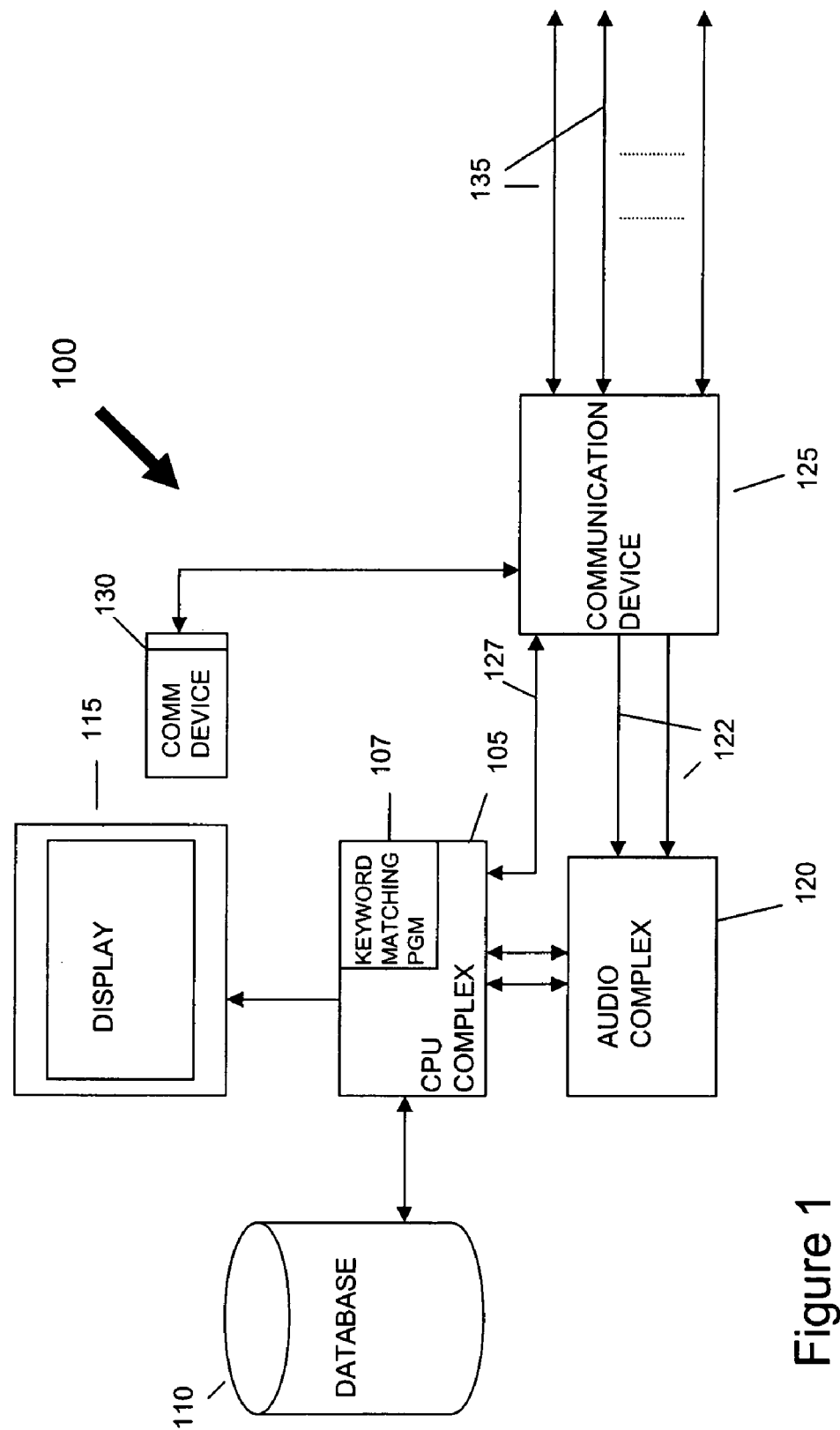
FIG. 1 is a block diagram of an embodiment of the invention.

FIG. 1 is a block diagram of an embodiment of a system of the invention, generally denoted by reference numeral 100. The system 100 comprises a processing complex 105 having a processor and memory and input and output ports. The processor complex 105 is suitable for running a keyword matching program 107 that may be a separate program interacting with other control programs and operating systems or may be an embedded software program as part of another software program, for example, an Automatic Call Distributor program (ACD), call center management program, or teleprompter control program. In embodiments, the processor complex 105 may be a personal computer having slots for acceptance of interface cards.

The processor complex 105 may be in communication with a database 110 which may be integral with the processor complex 105 or may be a distributed database, perhaps as part of a server in a client server configuration. The database 110 may involve any number of known databases such as DB2, Access, Oracle®, relational databases, or the like. The database may be pre-built to order keywords and/or phrases that may be linked to other topic areas. In embodiments, pre-defined terms may be stored as extensible markup language (xml) in the database. In effect, the keywords or phrases may provide links to any number of retrievable data records. When the keywords or phrases are pre-built, rules for governing the use of the keywords may also be associated with the keywords.

The rules may include, for example, (i) a profile identifier that indicates that the agent is knowledgeable of a particular subject area (e.g., the agent has been trained in the subject area);

(ii) a stipulation that the number of detected incidents of a keyword or phrase may have to exceed a threshold in order for the key word or phrase to trigger subsequent action (e.g., presentation of new information), (iii) an intelligent system allowing spontaneous environmental situations, e.g., within a call center, to dictate how new information may be presented, (iv) a dynamic check of environmental conditions; or (v) as keywords trigger potential topic changes, the rules may also dictate other checks such as a demographic check on the caller (e.g., based on caller-id, user-id, automatic number identification (ANI), or other caller identification techniques) and appropriate content may be queued for presentation based on demographic data of the caller.

(vi) as keywords trigger a rule, the rule may define additional keywords or phrases to be monitored. A rule may activate other rules.

The rules may change, dynamically, as the topics or information change on the display; that is, rules may be invoked which associates newly monitored keywords with the context of the new topic area. A rule may be triggered by an utterance of one or more keywords and may cause new keywords or phrases to be activated for monitoring. Also, the rules may also be optional.

A topic may be considered "covered" singularly or via a multi-tiered keyword recognition. By way of an example, if "militia, Ben Franklin, 1776, George Washington," has been recognized over the last "x" minutes, then the topic "revolutionary war" may be considered "covered."

The processor complex 105 may also control output presentations to a display device 115 such as a LCD display or monitor. An audio interface complex 120 provides necessary circuitry for receiving voice channels 122 such as a digital voice stream or analog stream from a communications device 125 such as an Automatic Call Distributor (ACD), Private Branch Exchange (PBX), router, gateway, telecommunications switch, or similar communications equipment capable of routing or switching calls. The digital voice channels may be a time multiplexed interface, wireless channels, an analog interface or other voice bearing channel technology as one of ordinary skill in the art would understand in view of the present disclosure.

The audio interface complex 120 may include one or more interface boards for analyzing voice streams of the caller and agent/user, and also may include interface boards for delivering the audio to external devices such as a telephone or headset for a user's interaction with a call. In embodiments, the audio complex 120 may be a commercially available interface board for insertion into a personal computer chassis that may have digital signal processors (DSPs) for analyzing voice streams.

Additionally, the communications device 125 may comprise Voice-over-Internet Protocol (VOIP) devices. The communications device 125 may provide a voice path to a user communication device 130 which may be a telephone set or headset, or the like. The communication device 125 may also simultaneously provide the same voice stream to the user communication device 130 and audio interface complex 120 which may be accomplished by conferencing or distributed broadcast of a digital (or analog) voice stream as one of ordinary skill in the art would understand in view of the present disclosure. In this way, the audio interface complex 120 may receive the same audio as a user. In embodiments, the user communication device 130 may receive audio connectivity from the audio interface complex 120.

The communications device 125 may process a call received over call paths 135 with coordinated control with the processor complex 105, which may require notification of ongoing call status. Signaling and control information may be accomplished over a signaling channel 127, but other control schemes are possible and contemplated by the invention. As a call is presented to a user (e.g., an ACD agent, PBX user, network user, or VOIP user) at the user communication device 130, the audio interface complex 120 receives the same audio stream as the user and may also receive the audio stream generated by the user. Coordination of the call identification and sequencing may be via a signaling protocol between communications device 125 and processor complex 105 with the audio interface complex 120 responding to controls from the processor complex 105 for instructions as to which channel to monitor for audio. In embodiments, the communication device 125 may include the keyword matching program 107, speech recognition software, an interface to database 110, and also performs call control and audio monitoring control. In embodiments, the display device 115 may also be under control of the communications device 125.

The call paths 135, bearing individual calls (perhaps a digital stream multiplexed bearing many calls), may be delivered by any type of transport technology and interconnection such as packet networks, ATM networks, T1 interfaces, analog interfaces, wireless interfaces, or the like. Also, a call may be a traditional type of call from a phone system (digital or analog) or it may also be a voice connection established over a network such as the Internet, VOIP enabled network, wireless network, or the like.

Figure 2:
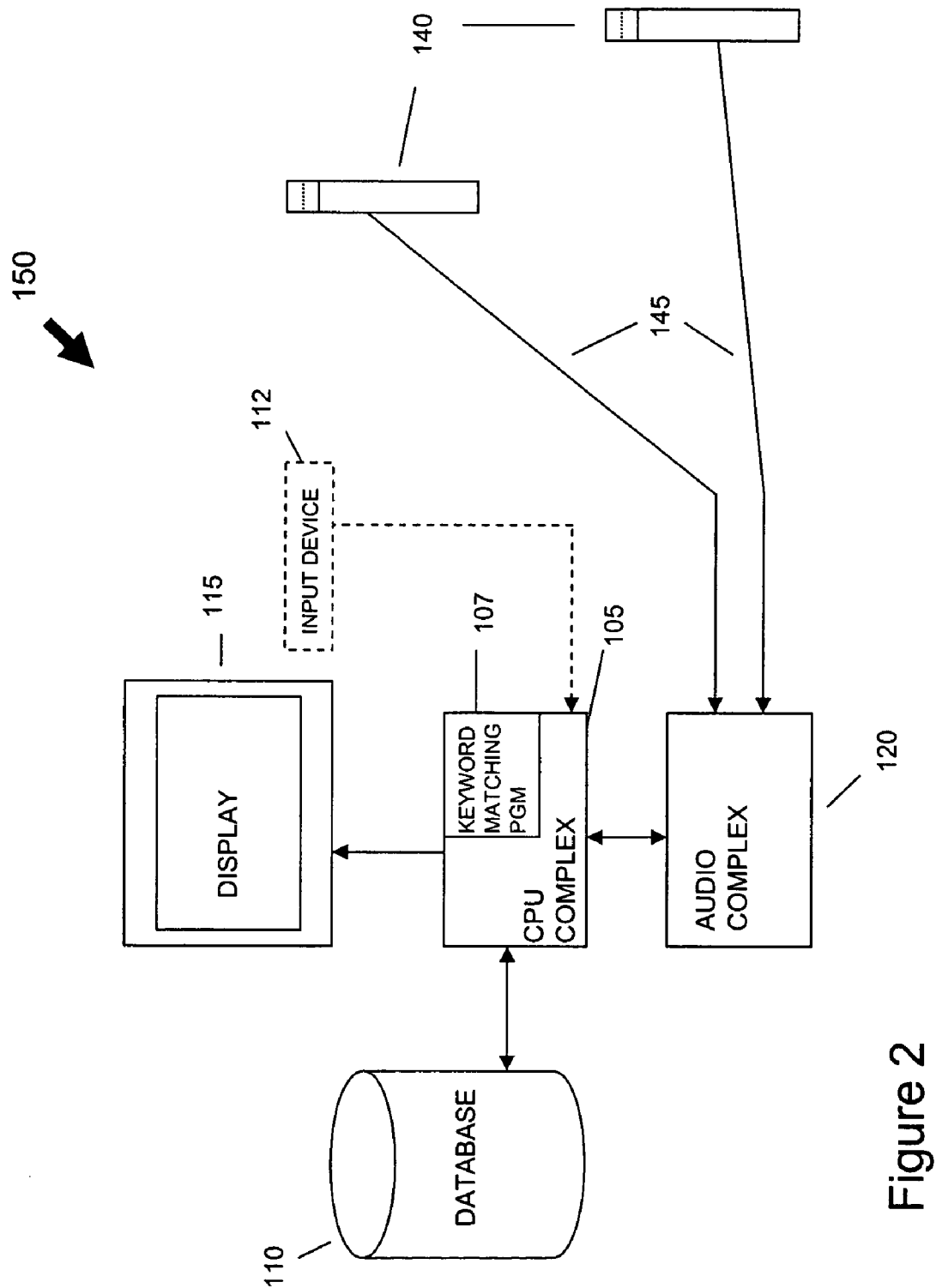
FIG. 2 is a block diagram of an embodiment of the invention.

FIG. 2 is an embodiment of the invention, generally denoted by reference numeral 150. In this embodiment, the processor complex 105 hosting the keyword matching program 107 may be interfaced with the database 110 and an audio interface complex 120. The audio interface complex 120 may have multiple audio inputs 145 for receiving audio streams for analysis of speech content from an audio input source 140 which may be any type of microphone. The audio interface complex 120 may include DSPs for analyzing speech for words and reports identified words to the processor complex 105. A user input device 112 (e.g., keyboard, mouse, telephone keys or the like) may optionally be provided for a user to choose and/or select topic items, as necessary.

In the embodiment of FIG. 1 or 2, a predetermined list of topics (i.e., keywords or phrases) may be initially presented on the display device 115. This list may be indicative of topics that should be, or are desired to be, covered during the conversation, monologue or presentation. This list may be a general guide to subjects or topics that may constitute a typical sequence, or general topical areas. As the keywords or phrases are detected and matched during a conversation, the appropriate associated subject matter (e.g., text, tables, pictures, graphs, animation, etc), if any, may be displayed and subsequently removed from the display as the topics of the list are detected and traversed.

Alternatively, or in addition to the above, the keywords in the list may be marked or grayed-out indicating that the subject area has been covered. In this way any topic area (i.e., keyword or phrase) that remains un-grayed provides a reminder to the speaker or agent that the subject/topic area has not been covered. In embodiments, the speaker or agent may select any topic area using an input device (e.g., mouse, keyboard, or even a telephone button, or the like) to override or preempt a current topic. When using the invention, a speaker or agent may deliberately call-up a topic area by intentionally speaking a pre-defined keyword or phrase. In this way, a repertoire of information, which may be categorized and stored in the database 110 beforehand and indexed by keyword or phrase, may be called upon dynamically to support the speaker or agent as a reference or guide.

FIG. 3 is an embodiment showing steps of the invention, beginning with step 300. FIG. 3 (and FIG. 4) may equally represent a high-level block diagram of components of the invention implementing the steps thereof. The steps of FIG. 3 (and FIG. 4) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Continuing with FIG. 3, at step 305, a keyword and/or phrase database is built searchable by keyword and/or phrase. A set of information that may include text, video, animation, lists, audio objects may be associated with the keywords and/or phrases. Any rules that may be pre-defined and built are associated with appropriate keywords and/or phrases. Rules and associated information may be optional. The rules typically govern the criteria, circumstances or conditions under which the keywords and/or phrases may be processed and may also govern which information may be presented. The rules may also dynamically condition decisions based on a user's or speaker's environment at the time of execution.

At step 315, a conversation or speech is monitored. This may include a phone call, a recorded conversation/presentation, or any live speech source or sources. At step 320, a check is made whether a keyword and/or phrase has been detected by matching candidate words and/or phrases with the pre-built database. This may involve receiving words or phrases from a speech recognition engine that parses and identifies candidate words and/or phrases. If no match occurs, then the monitoring process continues at step 322. At step 322, a check is made whether monitoring is still required, and if so, processing continues at step 315, otherwise, if no, the process ends at step 350. However, if a match is detected, then at step 325, a check is made if there is an associated rule or rules. If there are no rule or rules, then processing continues at step 335. If there is a rule or rules, then at step 330, the rule or rules are processed. At step 335, a check is made whether the rule or rules are satisfied (e.g., a criteria or condition, perhaps dynamic in nature, governing the rule has been met). If not, the process continues at step 315. If yes, then at step 340, any information associated with the keyword and/or phrases are extracted from a database and/or the detected keywords are displayed and/or marked as detected. Optionally, any new keywords according to the rule are activated for monitoring. At step 345, any extracted information is displayed. The information may be formatted to conform to a presentation format appropriate to the nature of the display's host application environment (e.g., the display may be navigation tabs or may be presented in panes of a computer display window in cooperation with an application program such as a call center application, an intelligent teleprompter control application, or the like). The process loops to step 315.

FIG. 4 is an embodiment of showing steps of the invention, beginning with step 400. At step 405, keywords and/or phrase(s) are predefined and may be listed as part of an application display (e.g., as part of a call center agent display or as part of an intelligent teleprompter display, or the like). At step 410, optionally, the keywords and/or phrase(s) also may be used in building a database of associated information. At step 415, optionally, any rules may be built. The rules may govern the usage of the information when a keyword and/or phrase(s) is detected, or, in embodiments, may also govern call control flow.

At step 420, speech monitoring and speech recognition may be activated for detection of the keywords and/or phrases. At step 425, any pre-defined keywords and/or phrase(s) may be dynamically recognized by speech recognition analysis. At step 430, a check may be made for any associated rule or rules for the detected keyword and/or phrase(s). If none, processing continues at step 440, otherwise, if a rule is found, then at step 435, the associated rule or rules may be processed. At step 440, any associated information or navigation tabs/options (e.g., web links, icons, or the like) for reaching associated information may be provided to a display for subsequent use by a user. At step 445, optionally, any detected and processed keywords and/or phrases may be marked as "completed", for example, by graying out (or changing color) a link, or item in a list of keywords. This may provide a tracking aid to a user for readily conveying which keywords and/or phrases have been already covered and which have not been covered. At step 450, a check is made whether monitoring of the speech may be terminated or is finished. This may be due to, for example, a call completion, a manual indication, or other triggering event. If not finished, the process continues at step 425, otherwise if finished, the process completes at step 455.

Example of Using the Invention

The following is one illustrative example describing the use of the embodiments of the invention. This example should not be construed as a limiting feature of the invention and is provided for illustrative purposes. Accordingly, one of ordinary skill in the art will readily recognize that other examples can also be used relying on the principles of the invention, within the scope of the disclosure and the claimed invention.

In use, as an audio stream is analyzed using known speech recognition technology, and as words are identified, typically by converting the detected speech to a character format, the keyword matching program searches a stored collection of keywords or phrases in the database for a match. Keywords may be grouped together, as necessary, creating a set of words to be used during the search and for matching as a set. When a match occurs, any rules associated with the stored keyword or phrase (or subsets of phrases) may be consulted to control the usage of the keyword. Further, the rule may trigger new or additional keywords to be activated for detection.

By using the rules, for example, a particular ACD agent involved with a received call may have a profile identifier that indicates that the agent is knowledgeable of a particular subject area (e.g., the agent has been trained in the subject area, has an affinity with the caller demographics, or other metric), therefore new prompts and/or data indicators (or subject data itself) may be presented to the agent on the display device. The agent may choose to navigate to the new data presented on the display device as circumstances dictate during the call.

Also, a rule may stipulate that the number of detected incidents of a keyword or phrase may have to exceed a threshold in order for the key word or phrase to trigger subsequent action (e.g., presentation of new information). The new information may be presented in various ways including navigation tabs by topic, a list of topic areas, text boxes with relevant material, or icons representing new topic areas.

Keywords may simply be tracked visually for a user. For example, Table 1 is a list of displayed keywords and may include:

TABLE 1

~~Topic 1~~

Topic 2

~~Topic 3~~

Topic 3F1
Topic 4

In the example of Table 1, keywords Topic 1 and Topic 3 are marked as 'covered" (indicated by the strikethrough, which alternatively may be a color change). Additionally, the detection of keyword Topic 3 (perhaps also dependent on detection of Topic 1) gives rise to another topic area, Topic 3F1, as a new suggested topic area to be covered.

The rules may also be intelligent so that spontaneous environmental situations, e.g., within a call center, may dictate how new information may be presented. For example, if a conversation is monitored and the keyword matching program identifies a new subject topic that may require access to other specialists (perhaps because the current agent is not trained on the potential new subject), the rule may then provide a list of the other specialists for possible transfer of the call. Also, the rule may also prohibit the list from being displayed (or alternatively displays "unavailable") if all the other specialists are unavailable or busy.

If the keyword matching program dynamically offers alternate topic selections to an agent, due to keyword detection in the audio stream, and the agent navigates to the new topic area (e.g., by selecting a new topic navigation tab), new sets of rules may be invoked which associates newly monitored keywords with the context of the new topic area. Also, as newly detected topical keywords are found in the database, associated supporting links to relevant documents, notes, lists, records, accounts may also be organized for dynamic presentation on the user's display device. In embodiments, the new information may be organized in a hierarchical manner so that an agent may navigate to appropriate levels of information, as needed.

If the keyword matching program is associated and coordinated with another application program such as an airline reservation system, an information desk program, or a brokerage program, for example, then the keyword and phrases may be tailored to access appropriate information for presentation to the agent/user on the user display 115 as necessary.

As a keyword is matched against predefined terms (or related terms), the associated key topic/word may be removed or perhaps grayed-out on the display device when the topic area has been covered during a conversation indicating that the topic area has been serviced. Other indicators may also be used to mark the topic area as "covered". In embodiments, audio may be queued for playback to a caller based on the caller's identification.

In a scenario when a speaker is using an intelligent teleprompter of the invention, as a display device (or similar display device), the intelligent teleprompter may contain one or more panes of information which may be dynamically altered based upon detected keywords or phrases. Audio may be captured by microphones either at the speaker's position and/or from the audience locations. As keywords or phrases are detected and matched by the keyword matching program, by comparing with predefined keywords or phrases contained in the database, new subject material may be presented in the one or more panes of the intelligent teleprompter for the benefit of the speaker. Optionally, the speaker may select new topic materials dynamically when presented on the intelligent teleprompter via an optional user input device (e.g., a mouse or keyboard, or similar device).

The system and method of the invention thus provides a convenient and efficient way to detect subject or topic progression in a conversation or speech. The result may be a circumstance driven presentation of supporting and/or hierarchically organized information to a user or speaker as context of a conversation progresses. In this way, new reference material, cues, or other information may be incorporated into the conversation in a timely and efficient manner.

While the invention has been described in terms of embodiments, those skilled in the art will recognize that the invention can be practiced with modifications and in the spirit and scope of the appended claims.

What is claimed is:

1. A method for dynamically detecting topics during one of a speech and a call center conversation, comprising:
predefining one or more keywords;
associating information with the one or more keywords;
detecting at least one of the one or more keywords during the speech or the call center conversation;
after the predefining, the associating and detecting, checking whether one or more rules are associated with the one or more detected keywords;
if so, processing the one or more rules; and
further comprising one of:
during the speech, utilizing an intelligent teleprompter and displaying the detected keywords and the information associated with the keywords and dynamically altering one or more panes of information of the intelligent teleprompter based upon the detected one or more keywords; and
during the call center conversation, displaying the detected keywords and the information associated with the keywords uttered by a caller to a call center agent and displaying an indication that a topic area has been covered by removing or graying out a displayed word.

2. The method of claim 1, wherein the one or more rules govern the conditions when the information associated with at least one of the detected keywords may be provided.

3. The method of claim 1, wherein the one or more rules control the processing of a call flow sequence.

4. The method of claim 1, further comprising monitoring at least any one of a telephone call, an audio input, and a recording as a source of the speech.

5. The method of claim 4, wherein the monitoring includes monitoring a call delivered via one of a network, a digital phone line, an analog line, a voice-over-internet protocol (VOIP).

6. The method of claim 1, further comprising building a database indexed by the one or more keywords.

7. The method of claim 1, wherein the one or more keywords comprise one or more phrases and the detecting detects the one or more phrases.

8. The method of claim 1, further comprising:
marking the one or more keywords when the one or more keywords has been detected.

9. The method of claim 1, wherein the one or more rules includes a profile identifier configured to indicate whether a call center agent has been trained in a subject area.

10. The method of claim 1, wherein the one or more rules includes determining a number of incidents of the at least one detected keyword and comparing the number of incidents to a threshold to trigger a subsequent action.

11. The method of claim 10, wherein the subsequent action is a presentation of new information to the call center agent.

12. The method of claim 1, wherein the one or more rules includes an intelligent system configured to dictate how new information is presented to the call center agent.

13. The method of claim 1, wherein the one or more rules includes a demographic check on a caller based on one or more of a caller ID, user ID, and automatic number ID, the demographic check used to queue content for presentation to the call center agent.

14. The method of claim 1, wherein at least one of the one or more rules triggers at least one of the one or more rules.

15. The method of claim 1, further comprising comparing the one or more detected keywords to a knowledge database indexed by the keywords, verifying that related information is germane, and displaying the associated information as the one or more keywords are detected.

16. The method of claim 1, further comprising dynamically changing the one or more rules as the information changes, wherein the one or more rules dynamically condition decisions based on a speaker's environment.

17. The method of claim 1, wherein the intelligent teleprompter contains one or more panes of information which can be dynamically altered based upon the one or more detected keywords and capturing in audio the conversation.

18. A method for dynamically detecting topics during a speech, comprising:
predefining one or more keywords;
associating information with the one or more keywords;
monitoring a conversation during the speech to detect at least one of the one or more keywords;
checking whether one or more rules are associated with the one or more detected keywords;
if so, processing the one or more rules;
determining whether the one or more rules are satisfied;
if so, extracting the information associated with the one or more keywords; and
during the speech, utilizing an intelligent teleprompter and displaying the information associated with the keywords;
marking displayed keywords of the intelligent teleprompter so as to indicate that subject matter associated with the displayed keywords has been covered; and
dynamically altering one or more panes of information of the intelligent teleprompter based upon the detected one or more keywords.

19. The method of claim 18, further comprising during the speech, displaying the detected keywords.

20. A method for dynamically detecting topics at a call center between a caller and a call center agent, comprising:
predefining one or more keywords relevant to a context of a first call center conversation;
associating information with the one or more keywords;
monitoring a second call center conversation to detect at least one of the one or more keywords;
checking whether one or more rules are associated with the one or more detected keywords;
if so, processing the one or more rules;
determining whether the one or more rules are satisfied;
if so, establishing new keywords;
during the second call center conversation, displaying the information associated with the keywords uttered by the caller to the call center agent; and
displaying an indication that a topic area has been covered by graying out a displayed word.

21. The method of claim 20, further comprising during the second call center conversation, displaying the detected keywords.

* * * * *